United States Patent [19]
Sim

[11] Patent Number: 5,588,305
[45] Date of Patent: Dec. 31, 1996

[54] AIR CONDITIONING SYSTEM FOR A VEHICLE

[75] Inventor: Hwan-Oh Sim, Kyungsangnam-Do, Rep. of Korea

[73] Assignee: Hyundai Motor Company, Ltd., Seoul, Rep. of Korea

[21] Appl. No.: 458,873

[22] Filed: Jun. 2, 1995

[30] Foreign Application Priority Data

Jun. 3, 1994 [KR] Rep. of Korea ............... 94-12955

[51] Int. Cl.⁶ .................................................. F25D 17/06
[52] U.S. Cl. .................................................. 62/419; 62/426
[58] Field of Search ............................. 62/404, 239, 244, 62/419, 426

[56] References Cited

U.S. PATENT DOCUMENTS

| 3,394,755 | 7/1968 | Morrison | 62/404 |
| 4,201,064 | 5/1980 | Krug et al. | 62/239 |
| 4,658,598 | 4/1987 | Schulz | 62/239 |
| 4,672,818 | 6/1987 | Roth | 62/239 |
| 4,702,307 | 10/1987 | Ito et al. | 165/42 |

FOREIGN PATENT DOCUMENTS

| 59517 | 4/1984 | Japan | 62/239 |

OTHER PUBLICATIONS

Central Air Cooling System, R. C. Kay and J. B. Randolph, IBM Technical Disclosure Bulletin, vol. 14 No. 2 (62–404).

Primary Examiner—William Doerrler

[57] ABSTRACT

An air conditioning system for a vehicle includes an evaporator disposed at a slant in a forward space of a blow case and at an exhaust side of a pair of blow fans and blow motors, the blow case having an upper blow case portion and a lower blow case portion wherein the lower blow case portion has an air inlet disposed therein, whereby the air conditioning system maintains the interior of the blow cases clean and induces the fresh air through the air inlet.

5 Claims, 1 Drawing Sheet

AIR CONDITIONING SYSTEM FOR A VEHICLE

BACKGROUND OF THE INVENTION

1. Field of the Invention

The present invention relates to an air conditioning system for a vehicle and more particularly, to an improved air conditioning system for a vehicle, which includes a blow fan, an evaporator disposed at an exhaust side of the blow fan, and a blow case with an air inlet formed in the bottom thereof for guiding air flow without any swirl of the air, and maintaining a clean blow case.

2. Description of Related Art

Various types of air conditioning systems for a vehicle are well known in the art. Generally, such conventional air conditioning systems include an evaporator disposed at an intake side of a pair of blow fans with the blow fans having blow motors in connection therewith. In other words, the air flow passes the evaporator and thereafter, passes the blow fans.

As shown in FIGS. 1 and 2, the conventional air conditioning system comprises a unit case 10, an evaporator 12 disposed at a slant in the unit case 10, a pair of blow fans 16 operated by blower motors 14, with the blow fans and blower motors disposed forward of the evaporator 12. The blow fans 16 are provided with upper and lower blow cases 18a and 18b disposed therearound. Also, an air inlet 11 is disposed in a back or intake side of the evaporator 12 and the blow case 18, and an air outlet 13 is disposed at an exhaust side of the fan 16 as shown in FIG. 1. Generally, the upper blow case 18a has an arcuate configuration and the lower blow case 18b has a linear configuration as shown in FIG. 2. Therefore, dust usually lies in the bottom of the lower blow case 18b. Accordingly, when the air conditioning system operates, the dust lying in the bottom of the lower blow case 18b is introduced into the seat area of the vehicle.

Furthermore, since the air inlet 11 is disposed in the back side and upper portion of the evaporator 12, when the air flow is absorbed by the blow fans 16, the contaminated air will likewise contaminate the fresh air.

Accordingly, the conventional air conditioning system operates as follows (FIG. 2). Air is introduced into the blow case 10 by the suction power of the blow fans 16 through the air inlet 11. Thereafter, the air flow moves to the evaporator 12 and the blow fans 16. Finally, the air flow passes into the interior of the vehicle through the blow cases 18a and 18b and the air outlet 13.

However, such conventional air conditioning systems suffer from a number of problems such as, for example, there is some loss of the air flow from the air inlet 11 to the air outlet 13 since the evaporator 12 is located in advance of the intake of the blow fans 16. It is difficult to expect a sufficient cool down effect and to expect fresh incoming air, and it is difficult to maintain a pleasant and comfortable feeling for a driver and passengers and to maintain a clean lower blow case 18b, in order to prevent the collected dust from scattering in the seat area of the vehicle.

SUMMARY OF THE INVENTION

Accordingly, it is an object of the present invention to provide an air conditioning system for a vehicle, which eliminates the above problems encountered with the conventional air conditioning systems for a vehicle.

Another object of the present invention is to provide an air conditioning system for a vehicle, which includes a unit case, a pair of blow fans and motors, a pair of blow cases disposed around the blow fans, an air inlet disposed substantially below the blow fans and within a lower blow case, and an evaporator disposed at an exhaust side of the blow fans, whereby the fresh air is introduced through the air inlet and clean air is maintained in the blow cases, particularly the lower blow case, in order to prevent dust from scattering into the seat area of the vehicle.

Still another object of the present invention is to provide an air conditioning system for a vehicle which is simple in structure, inexpensive to manufacture, and durable in use.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an air conditioning system for a vehicle, which includes an evaporator disposed at a slant within a forward space or an exhaust side of a pair of blow fans and blow motors, and an upper blow case and a lower blow case wherein the lower blow case has an air inlet formed therein, whereby the air conditioning system maintains the interior of the blow cases clean and induces the fresh air through the air inlet.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
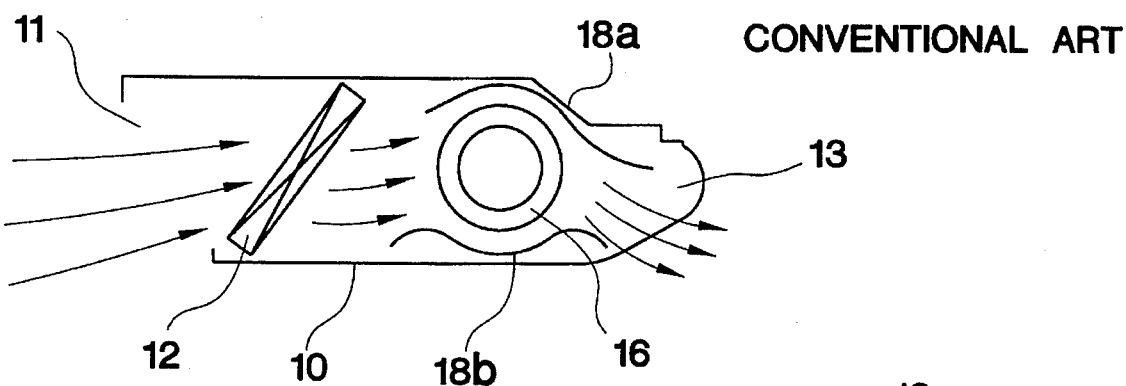
FIG. 1 is a sectional view of a conventional air conditioning system for a vehicle.
Figure 2:
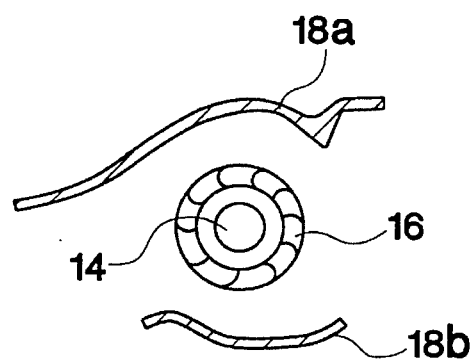
FIG. 2 is a sectional view of a conventional air conditioning system showing upper and lower blow cases thereof.
Figure 3:
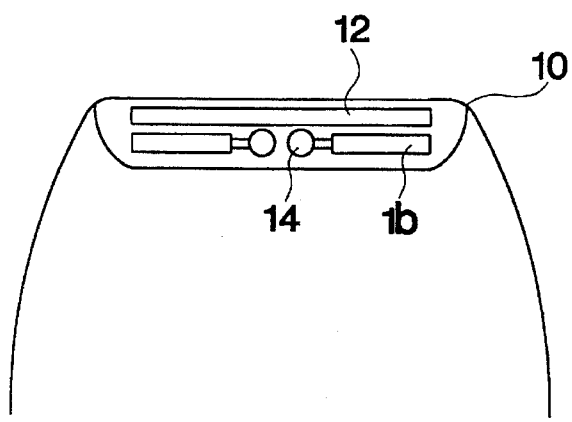
FIG. 3 is a partially diagrammatic top plan view of an air-conditioning system for a vehicle according to the present invention.
Figure 4:
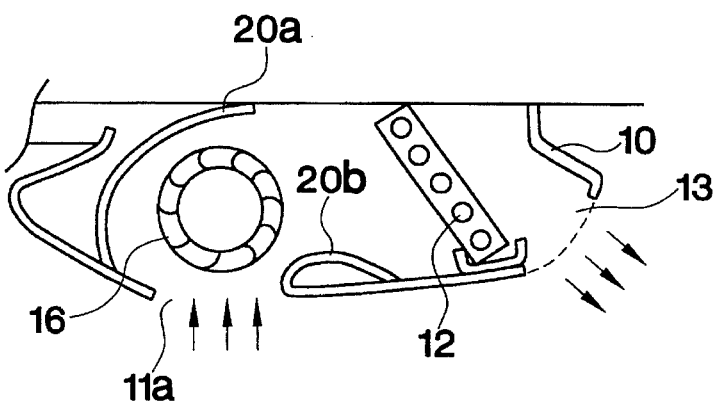
FIG. 4 is a sectional view of the air conditioning system showing upper and lower blow cases according to the present invention.

Referring now in detail to the drawings for the purpose of illustrating preferred embodiments of the present invention, the air conditioning system for a vehicle as shown in FIGS. 3 and 4, comprises a unit case 10, a pair of blow fans 16 and blow motors 14 disposed in the unit case 10, a forwardly slanted evaporator 12 disposed in a forward space of the unit case and at an exhaust side of the blow fans 16, and a pair of blow cases 20a and 20b provided in connection with the unit case and disposed around each blow fan 16 for uniformly blowing the air flow. The pair of blow fans 16 and blow motors 14 are disposed in a straight line to each other.

The pair of blow cases 20a and 20b define an upper blow case 20a and a lower blow case 20b. The lower blow case 20b is provided with an air inlet 11a so that the fresh air is introduced directly to the blow fans 16 from substantially below the blow fans 16 through the air inlet 11a as shown in FIG. 4. Preferably, the upper blow case 20a has an arcuate configuration and the lower blow case 20b has an initial raised portion disposed on a planar surface configuration (FIG. 4). Therefore, dust and debris does not lie on the initial raised portion of the lower blow case 20b so that even if the air conditioning operates, it maintains a very clean seat area of the vehicle.

Furthermore, since the upper blow case 20a has the arcuate configuration, and in addition, the lower blow case 20b has the initial raised portion, the air conditioning system of the present invention accelerates the air flow without any swirl of the air flow and minimizes resistance of the air flow.

As shown in FIG. 4, the air conditioning system for a vehicle of the present invention operates as follows. When the air conditioning system operates, the blow fans 16 rotate by operation of the blow motors 14. Therefore, the air flow is introduced into the air outlet 13 from the air inlet 11 through the blow fans 16 and then the evaporator 12.

Thus, the air conditioning system according to the present invention includes the evaporator 12 disposed in the forward space of the unit case and at an exhaust side of the blow fans 16 and the blow cases 20a and 20b. Accordingly, the air flow passes through the blow fans 16 and thereafter the air flow accomplishes the heat exchange at the evaporator 12. Therefore, the cooling air smoothly scatters into the seat area of the vehicle through the air outlet 13 in the direction indicated by arrows as shown in FIG. 4.

At this time, nearly fresh air incomes from the air inlet 11a in a vertical direction as indicated by arrows. Also, even if there is any dust present, the dust cannot lie on the lower blow case 20b due to the raised portion of the lower blow case 20b, and the present air conditioning can maintain the seat area of the vehicle clean. Therefore, dust does not lie on the bottom of the lower blow case 20b when compared with the blow cases of the conventional air conditioning system.

Furthermore, the swirl of the air flow cannot be created when the air conditioning system operates since the upper blow case 20a has the arcuate configuration and the lower blow case 20b has the hill configured therein, at an initial portion thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioning system for a vehicle, said air conditioning system comprising:

a unit case;

a pair of blow fans and corresponding blow motors disposed within said unit case;

an evaporator disposed at a forward space of said unit case and at an exhaust side of said pair of blow fans;

an upper blow case and a lower blow case disposed around each of said pair of blow fans, respectively, said lower blow case including an initial semispherical protrusion formed therein and said upper blow case including an arcuate portion complementary in shape to the semispherical protrusion;

an air inlet disposed at a lower space of each of said pair of blow fans and formed within said lower blow case for effectively intaking the fresh air therethrough and directing the intake air vertically at said pair of blow fans; and an air outlet disposed at a side of said evaporator opposite to said pair of blow fans, whereby the air conditioning system provides a clean condition since the semispherical protrusion prevents dust from settling on a floor surface of the lower blow case, and effectively supplies fresh air through the air inlet.

2. The air conditioning system of claim 1, wherein the arcuate shaped configuration of said upper blow case has an inwardly arcuate shaped configuration.

3. The air conditioning system of claim 1, wherein said pair of blow fans and blow motors are located in a straight line.

4. The air conditioning system of claim 1, wherein said evaporator is forwardly slanted for accelerating the air flow and effectively exchanging heat therethrough.

5. The air conditioning system of claim 1, wherein the semispherical protrusion formed in said lower blow case is formed immediately adjacent said air inlet.

* * * * *